(No Model.) 3 Sheets—Sheet 1.
J. W. HYATT.
GRANULAR FILTER BED.
No. 417,037. Patented Dec. 10, 1889.
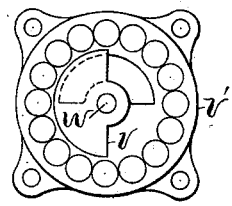
Fig. 4.
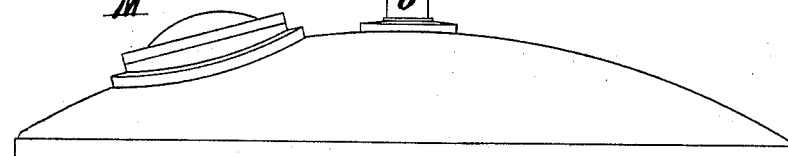
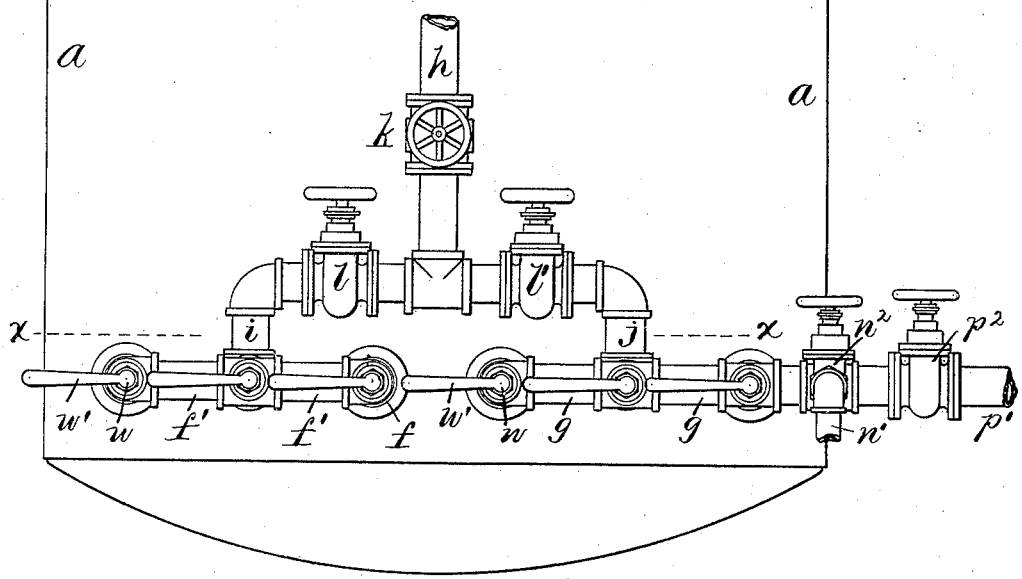
Fig. 1.
Attest:
L. Lee,
F. C. Fischer.
Inventor.
John W. Hyatt, per
Crane & Miller, Attys.

(No Model.)  3 Sheets—Sheet 3.

J. W. HYATT.
GRANULAR FILTER BED.

No. 417,037.  Patented Dec. 10, 1889.

Attest:
L. Lee.
F. C. Fischer.

Inventor.
John W. Hyatt, per
Crane & Miller, Attys.

UNITED STATES PATENT OFFICE.

JOHN W. HYATT, OF NEWARK, NEW JERSEY.

GRANULAR FILTER-BED.

SPECIFICATION forming part of Letters Patent No. 417,037, dated December 10, 1889.

Application filed May 24, 1889. Serial No. 311,965. (No model.)

*To all whom it may concern:*

Be it known that I, JOHN W. HYATT, a citizen of the United States, residing at Newark, Essex county, New Jersey, have invented certain new and useful Improvements in Apparatus for Operating Granular Filter-Beds, fully described and represented in the following specification and the accompanying drawings, forming a part of the same.

The object of this invention is to maintain the efficiency of a granular filter-bed for a long space of time without wholly cleansing the same; and the invention consists in the introduction of the unfiltered fluid successively through a series of strainers or screens in the lower part of the filter-bed, whereby the entering fluid cuts a substantially vertical passage through the bed and filters through both the side and the top of the same to reach the outlet-strainers. The area of filtering-surface with a bed of given dimensions is thus greatly increased, and when the side of such filter-bed becomes foul after a certain degree of use the introduction of the unfiltered fluid at an adjacent screen operates to disintegrate and cut away the foul surface upon the vertical side of the filter-bed, so as to expose a fresh lateral surface through which the water may percolate to the outlet-strainers. By such a mode of using the filter-bed as many fresh lateral surfaces for the percolation of the fluid may be secured as there are inlets provided in the bottom of the filter-bed, and the cleansing of the entire filter-bed may be deferred for a much longer period than when the water is merely introduced upon the top of the filter-bed and the top only is used for percolation. When the entire filter-bed becomes too foul for further use, the water is admitted at all the bottom strainers, and the impurities are floated off through an outlet above the surface of the filter-bed.

In the construction which I have devised for practicing this process the same strainers serve in succession as inlets and outlets for the fluid, and no outlet is required above the top of the filter-bed except in washing the filter.

The apparatus is shown in the annexed drawings, in which—

Figure 2:
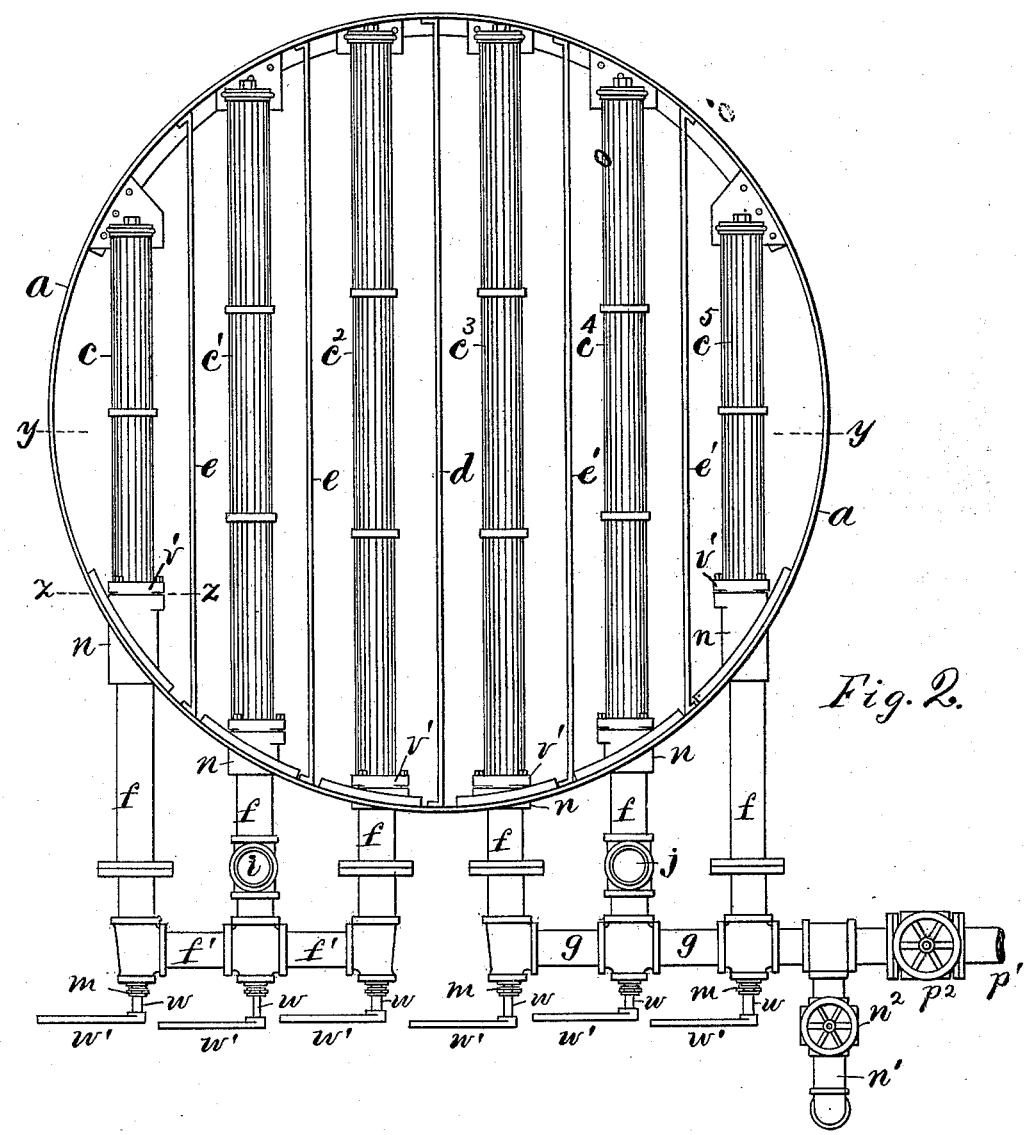
Figure 3:
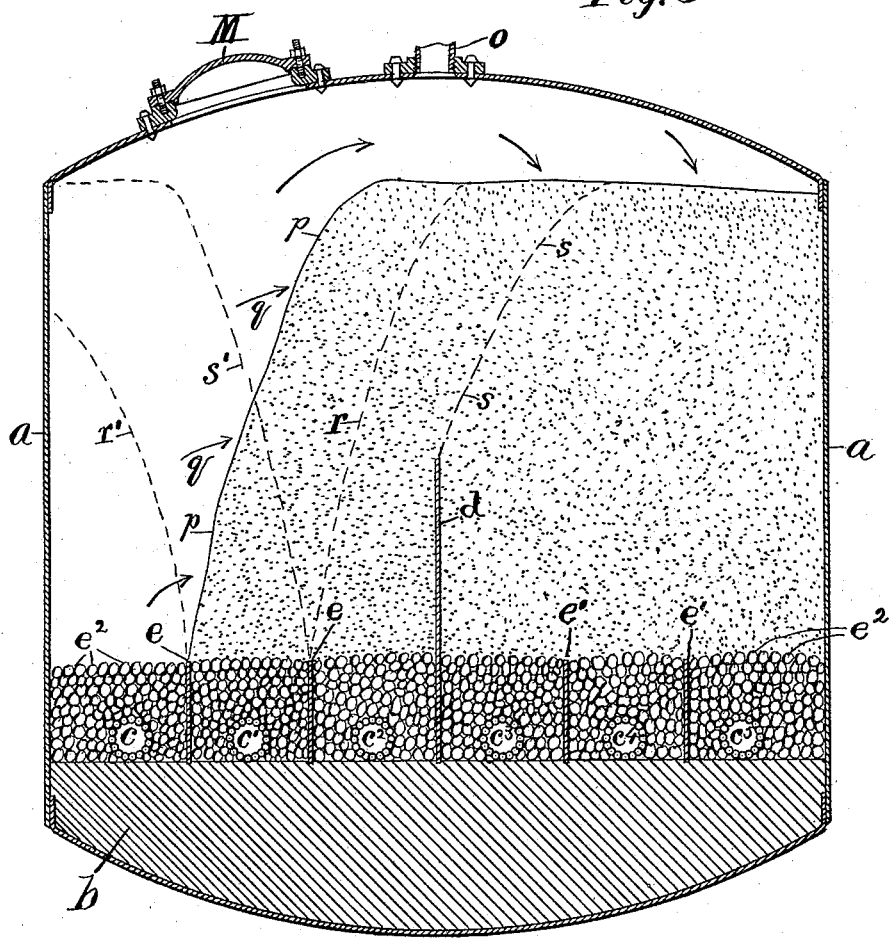

Figure 1 is an elevation of a filter-casing about eight feet high and eight feet in diameter, with the cocks and pipes for operating the same. Fig. 2 is a plan of the same on line $x$ $x$ in Fig. 1, and Fig. 3 is a vertical section of the same on line $y$ $y$ in Fig. 2; Fig. 4, a section of one of the strainer-valves on line $z$ $z$ in Fig. 2.

$a$ is the shell of the filter provided with convex heads at the top and bottom, which in practice are set upon suitable foundations, and which resist the internal pressure without the use of vertical stays.

$b$ is a concrete filling in the bottom of the filter to afford a level surface.

$c\ c'\ c^2\ c^3\ c^4\ c^5$ are six strainers formed of a series of rods held in an annular bundle, as claimed in my patent application Serial No. 294,140, and arranged at equal distances from one another beneath portions of the filter-bed having substantially equal width.

$s$ is the top of the filter-bed; $d$, a vertical partition extended half-way upward dividing the filter-bed in half from the bottom about half-way to the top.

$e$ are partitions about fifteen inches in height inserted between the strainers $c'$ and $c^2$, and $e'$ are similar low partitions inserted between the strainers $c^3$, $c^4$, and $c^5$.

$o$ is an outlet-pipe provided with cock $o'$ above the level of the filter-bed, and M a man-hole for access to the filter.

The space above the strainers between the several partitions would be filled with gravel $e^2$ to the tops of the low partitions, and the remainder of the filter-bed up to the line $s$ would be formed of fine sand or other suitable material.

The strainers $c\ c'\ c^2$ are provided each with a valve $v$, seated upon a casting $v'$, connecting the end of the strainer with the inner end of a tube $f$, which is extended through the shell of the filter and connected with a water-supply, as follows: The pipes of the strainers $c\ c'\ c^2$ are coupled together by a header $f'$, and are connected with a water-supply from the main pipe $h$ and branch $i$. The other three strainers are connected in a similar manner with a header $g$ and with the main pipe $h$ by a branch $j$.

A cock $k$ is provided in the pipe $h$ and other cocks $l\ l'$ in the branches $i$ and $j$. The water may thus be thrown into either header at pleasure by opening the cock $k$ and closing one of the cocks $l\ l'$, and either strainer may be connected with such header and receive a water-supply by opening the valve $v$ applied to such strain.

In Fig. 4 the casting $v'$ is shown with a nearly-semicircular hole, upon which is seated a semicircular disk $v$, turned by a rod $w$, and a handle $w'$ extended outside of the header through a stuffing-box $m$. The casting itself serves to connect the strainer with a socket $n$, secured to the shell of the filter to introduce the pipe $f$ through the shell at the required angle. Branches $n'$ and $p'$ are attached to the header $g$ and provided with cocks $n^2$ and $p^2$. In filtering with this construction, the strainers $c\ c'\ c^2$ would be used in turn as inlet-strainers for the unfiltered fluid, and the strainers $c^3\ c^4\ c^5$ would be used exclusively as outlet-strainers. The unfiltered fluid would be admitted to the header $f'$ by pipe $h$ and cocks $k$ and $l$, the cock $l'$ being closed to exclude the unfiltered water from the header $g$, and the cock $n^2$ being opened to discharge the filtered water therefrom. But one of the inlet-strainers would be opened at once, and Fig. 3 represents the strainer $c$ open and the filter-bed disintegrated above the same on the line $p$. Arrows $q$ show the passage of the unfiltered water to the vertical and horizontal surfaces of the filter-bed, through which it passes to the strainers $c^3\ c^4\ c^5$ and thence out to the pipe $n'$. The exposed surface of the filter-bed, with this mode of operation, includes a much larger area than the mere horizontal line of the bed would afford, and the filter thus operates for a much longer period of time without becoming fouled. When the operative surface of the filter-bed becomes obstructed by the deposition of impurities, the strainer $c$ would be cut off by closing its valve $v$, and the adjacent strainer $c'$ would be placed in communication with the header by opening its inlet-valve. The influx of the water through that strainer would cut away the foul surface (indicated by the line $p$) and would expose a fresh surface, (indicated by the line $r$,) the loosened sand being partly deposited over the strainer $c$, as shown by the line $r'$. In each case the partition or partitions $e$ adjacent to the open strainer would prevent the water discharged from the sides of such strainer from undermining the sand-bed, and would direct the flow of the current upward sufficiently to determine the line upon which the bed would be divided, as at $p$ and $r$. A new operative surface would thus be immediately secured within the filter, and the filtering operation could be continued without the delay of cleansing the entire filter.

When the surface adjacent to the strainer $c'$ has become fouled, such strainer can be cut off from the header and the strainer $c^2$ connected therewith, when the surface $r$ would be cut away in like manner and the operative surface changed to the line $s$, the loosened sand being then partly deposited over the strainer $c'$, as shown by the line $s'$.

By means of the partitions $e$ the current is prevented from passing laterally into the filter-bed and thus undermining the same; but the object of the central partition D, which is to extend higher than the others, is to prevent the water, when introduced through the strainer $c^2$, from passing through too short a portion of the filter-bed to reach the adjacent outlet-strainer $c^3$. Were the water permitted to thus pass, the impurities would not be properly removed therefrom, and the central partition, which divides the group of inlet-strainers from the group of outlet-strainers, therefore operates to deflect the fluid to an upper portion of the filter-bed, through which it must afterward percolate downward before it can escape from the filter, and the purification of the water is thus as perfectly effected when the water is admitted by either of the strainers $c$, $c'$, or $c^2$.

The impurities deposited in the filter during the successive use of the three inlet-strainers become an accumulation of mud, which remains within the filter until it is wholly cleansed. This is effected by first opening the outlet-pipe $o$ and then in turn opening each one of all the strainers within the filter, the full face of the cleansing-current being thus directed in succession upon each of the six portions of the bed over each of the six strainers, and the fluid being finally admitted through all the strainers to rinse the entire bed before renewing the filtering operation. In such a washing operation the cock $n^2$ is closed, and the water is admitted to each of the strainers $c^3\ c^4\ c^5$, when required, by opening the valve $v$, connected therewith, and directing the water into the header $g$ by closing the cock $l$ and opening the cock $l'$.

The cock $p^2$ is provided to draw off from the header $g$ the water first filtered, which might not perhaps be sufficiently pure to use as filtered water, and would not therefore be properly admitted to the pipe $n'$.

It will be seen from the above statements that the object of my invention is to increase the effectiveness and extend the use of the filter-bed before cleansing the same throughout, and as the invention consists, essentially, in introducing the water into the bottom of the filter-bed in succession through a number of adjacent inlet-strainers it is obviously immaterial what construction of strainers be employed, what kind of outlets be provided to draw the filtered water from the bed, and what arrangement of cocks and pipes be made to direct the water into the desired channel.

It is common to reverse the current through the outlet-strainers in washing a filter-bed, as is done in the strainers $c^3\ c^4\ c^5$ herein; but I I am not aware that a granular filter-bed has ever been provided in its bottom with a series of inlet-strainers through which the water was admitted in succession to cut away a portion of the filter-bed above such strainer to the top of the filter-bed to remove a deposit of silt from a nearly-vertical surface and to expose a fresh and nearly-vertical portion of the bed to the unfiltered fluid. Neither am I aware that a granular filter-bed has ever been provided with two sets of strainers occupying distinct portions of the filter-bed and connected normally with inlet and outlet pipes, as in my construction. Neither am I aware that any granular filter-bed has ever been provided with a set of inlet-strainers with connections for bringing them into successive use, and with a set of outlet-strainers, through which the current could be reversed at pleasure to cleanse a portion only of the filter-bed.

The only object in using gravel $e^2$ adjacent to the inlet and outlet screens is to remove the finer material of the filter-bed from contact with such screens, by which means I am enabled to use screens of coarser nature and more imperfect construction; but my invention may be operated without the low partitions $e$ and $e'$ if the screens are of sufficient fineness to prevent the escape of the fine substance of which the filter-bed is composed.

Where separate coarse screens are used and gravel is placed adjacent to them upon the bottom of the filter-bed, the introduction of water at any one of the screens would without the low partitions circulate the water through all of such coarse gravel and thus undermine the bed at all points, instead of disintegrating it only over a single screen, as is required in my invention. I do not, however, limit myself to the use of the partitions between the several screens, as the screens may be made of suitable fineness to prevent the escape of the filtering medium.

I have shown convex heads for the filter casing in the drawings; but the construction of the casing is wholly immaterial, and flat heads stayed with suitable rods may be used without interfering with the operation of the other elements described.

I hereby disclaim my patent, No. 273,539, dated March 6, 1883, as I have in the second clause of the claim of such patent secured the exclusive right to agitate the vertical portion of the filter-bed above an inlet while the surrounding portions remain in a quiescent condition.

It is obviously immaterial what kind of screens or strainers be connected with the inlet and outlet valves, or what number of strainers be connected with each of such valves.

The strainers $c$, $c'$, and $c^2$ are intended to be used only for the introduction of fluid to the filter, and do not, therefore, operate to strain or clarify any fluid whatever, but act merely as screens to protect the water-inlets from the intrusion of the filtering material.

Having thus set forth my invention, what I claim herein is—

1. The combination, with a granular filter-bed, of suitable outlet-strainers for the filtered water in the bottom of the bed, and a series of inlets arranged in the bottom of the bed and provided with suitable valves for connecting them in turn with the supply of unfiltered water, substantially as set forth.

2. The combination, with a granular filter-bed, of suitable outlet-strainers for the filtered water in the bottom of the bed, a series of inlets arranged in the bottom of the bed, and suitable valves to direct the water for washing into either the inlet or outlet strainers, or both, in cleansing the filter-bed, substantially as set forth.

3. In a filter, the combination, with a filter-casing and a filter-bed therein, of several inlets arranged under adjacent portions of the filter-bed, partitions between such inlets to divert the current upward, and suitable outlet-strainers arranged under a different portion of the filter-bed, substantially as herein set forth.

4. In a filter, the combination, with a filter-casing and a filter-bed therein, of several inlet-strainers arranged under adjacent portions of the filter-bed, partitions between such inlet-strainers to divert the current upward, suitable outlet-strainers arranged under a different portion of the filter-bed, and a partition extended partly upward into the filter-bed between such inlet and outlet strainers, as and for the purpose set forth.

5. The combination, with a granular filter-bed, of suitable outlet-strainers for the filtered water, a cock closing the outlet therefrom, a series of inlet-strainers arranged in the bottom of the bed, a supply-pipe for unfiltered water, and suitable valves for directing the washing-water at pleasure into either the inlet or outlet strainers, or both, and an outlet for the impurities from the top of the filter during the washing of the filter-bed, substantially as herein set forth.

In testimony whereof I have hereunto set my hand in the presence of two subscribing witnesses.

JOHN W. HYATT.

Witnesses:
 THOS. S. CRANE,
 HENRY J. MILLER.